(12) United States Patent
Chen

(10) Patent No.: US 6,347,852 B1
(45) Date of Patent: Feb. 19, 2002

(54) SYSTEM AND METHOD OF APPLYING DOUBLE PRINTING MODES

(75) Inventor: Liang-Chih Chen, Taipei Hsien (TW)

(73) Assignee: Destiny Technology Corporation (TW)

( * ) Notice: Subject to any disclaimer, the term of this patent is extended or adjusted under 35 U.S.C. 154(b) by 0 days.

(21) Appl. No.: 09/460,692

(22) Filed: Dec. 14, 1999

(30) Foreign Application Priority Data

Dec. 18, 1998 (TW) .......................................... 87121241 A

(51) Int. Cl.$^7$ .......................... B41J 2/005; G06K 15/00
(52) U.S. Cl. ............................ 347/5; 358/1.13; 347/900
(58) Field of Search ............................... 358/1.13, 501, 358/502, 503; 347/900, 5, 224, 1

(56) References Cited

U.S. PATENT DOCUMENTS 5,195,176 A * 3/1993 Lung .......................... 358/1.13

* cited by examiner

Primary Examiner—Huan Tran

(74) Attorney, Agent, or Firm—Thomas M. Moga, Esq.; Powell, Goldstein, Frazer & Murphy LLP

(57) ABSTRACT

A method and system for simplifying required printer commands and facilitating print speed of both laser and inkjet printers is disclosed. When an operating system outputs a print page, a printer driving unit firstly estimates the time respectively consumed by applying the raster bitmap and high-level printer language approaches. Estimation of the printer driving unit is then routed into a print page processing unit for further processing. The print page is manipulated by using the raster bitmap approach in the print page processing unit when the time consumption of the print page estimated by using the raster bitmap approach is less than the other one. Otherwise, the print page is divided into a plurality of print bands for further processing. Complexity of the printer commands required for each print band is then estimated to judge whether the complexity is higher than a predetermined band threshold. All those print bands whose complexities are higher than the band threshold are processed to generate raster bitmap data firstly, and followed by encapsulating the data into printer commands before storing back to memory. All printer commands of the print bands are fetched from the memory and then printed via a printer engine after color matching and halftoning processing are performed for graphics and texts.

20 Claims, 6 Drawing Sheets

SYSTEM AND METHOD OF APPLYING DOUBLE PRINTING MODES

BACKGROUND OF THE INVENTION

1. Field of the Invention

The present invention relates to a printing system and method by using double printing modes, and more particularly, to a printing system and method for estimating complexities of required printer commands in order to decide which printing mode between the raster and high-level printer language approaches is selected. The invention also relates to a system and method for simplifying the printer commands to fasten the print speed of both laser and ink-jet printers.

2. Description of the Prior Art

The advent of electrical engineering brings printers to be an important computer peripheral device today because many reports or the like need to be converted into paper documents through kinds of printers. Users can select an image or a document file on a computer host (such as a PC or workstation) and then print out the selected one. Basically, the selected image usually a color image (e.g., a true color image) but even a color printer can not manipulate all colors, image processing is therefore required before providing a satisfactory print page. Nowadays, ink-jet and laser printers are commonly used printers. In the conventional ink-jet printers, a raster bitmap processing is the most broadly employed approach for printing a print page, on the other hand, a high-level printer language such as printer control language (PCL) or postscript language is mostly used to describe print pages in laser printers.

Basically, those printers which employ the raster bitmap scheme usually manipulates print pages at computer hosts and then transfer the processed print page (has been converted into bitmap data, i.e., a color channel indicated by a bit) to the spoolers or printers for printing on pieces of papers. Therefore, less time costly is required in the ink-jet printers by utilizing the raster bitmap approach. Additionally, the data size of a raster bitmap image is usually large, especially when a true color format which employs 24 bits per pixel (8 bits respectively for red, green and blue channels) is used, an ink-jet printer therefore directly prints the completely processed image data, which are converted into a format of 3-bit per pixel (i.e., 1 bit for each R, G and B channel). Although larger time consumption is required for manipulating the raster bitmap data, however, quite a satisfactory printing result much closer to the display image is obtained, which achieves the WYSIWYG (What you see is what you get) requirement.

On the other hand, the high-level printer language used conventionally illustrates the contents of a print page by using printer commands, for example, a circle is represented by its radius and center, therefore the data size is smaller than that of a raster bitmap image. The communication efforts between the computer hosts and printers can be significantly degraded except those complicated regions, such as repeatedly sticking images in an identity region. However, although a flexible approach provided by the high-level printer language, additional elements, for example, an ASIC in accompanied with enough memory, are needed to compatibly manipulating the print page illustrated by the high-level printer language in order to perform the image processing such as color matching and halftoning, etc. Moreover, unexpected errors may be arisen when the high-level printer language is employed in a CMYK color printer although the printed output still remains an acceptable printing quality. Accordingly, the advantage which effectively reducing the required processing time when applying the high-level printer language makes itself quite suitably employ in laser printers instead of ink-jet printers.

Although different advantages offered by the aforementioned approaches, however, different print pages usually require printer commands having different complexities, and furthermore, the required time consumption for performing each the printer command is different to each other. It is time costly to print a page by performing unnecessary image processing steps in the raster bitmap approach when the print page requires only few and simple printer commands in the high-level printer language scheme. In contrast, it is still a time costly case when the high-level printer language is employed to manipulate a complicated print page. For the laser printer engines, which can not be halted until the printing job is finished or terminated, overrun may occur to print empty regions on papers because the printer engines can not wait for the print page being completely processed. Moreover, a faster CPU and more memory are required for performing the high-level printer language approach, which will increase the manufacturing cost of the printers. A need has been arisen to disclose a printing system and method, in which the above-mentioned disadvantages of the conventional approaches can be effectively eliminated.

SUMMARY OF THE INVENTION

It is a principal object of the invention to propose a method and system that manipulates the print pages by using double printing modes.

It is a further object of the invention to provide simpler printer commands than the conventional approaches, which are suitable for laser and ink-jet printers, therefore to fasten the print speed.

According to the above objects, the disclosed method and system estimates the complexity of printer commands to decide which printing mode is going to be selected. When an operating system outputs a print page, a printer driving unit firstly estimates the time respectively consumed when applying the raster bitmap and high-level printer language approaches. Estimation of the printer driving unit is then routed into a print page processing unit for further processing. The print page is manipulated by using the raster bitmap approach in the print page processing unit when the time consumption of the print page estimated by using the raster bitmap approach is less than the other one. Otherwise, the print page is divided into a plurality of print bands for further processing. Complexity of the printer commands required for each the print band are then estimated to judge whether the complexity is higher than a predetermined band threshold. All those print bands whose complexities are higher than the band threshold are processed to generate raster bitmap data firstly, and followed by encapsulating the generated data into printer commands before storing back to memory. All printer commands of the print bands are fetched from the memory and then printed via a printer engine after color matching and halftoning processing are performed at graphics and texts.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
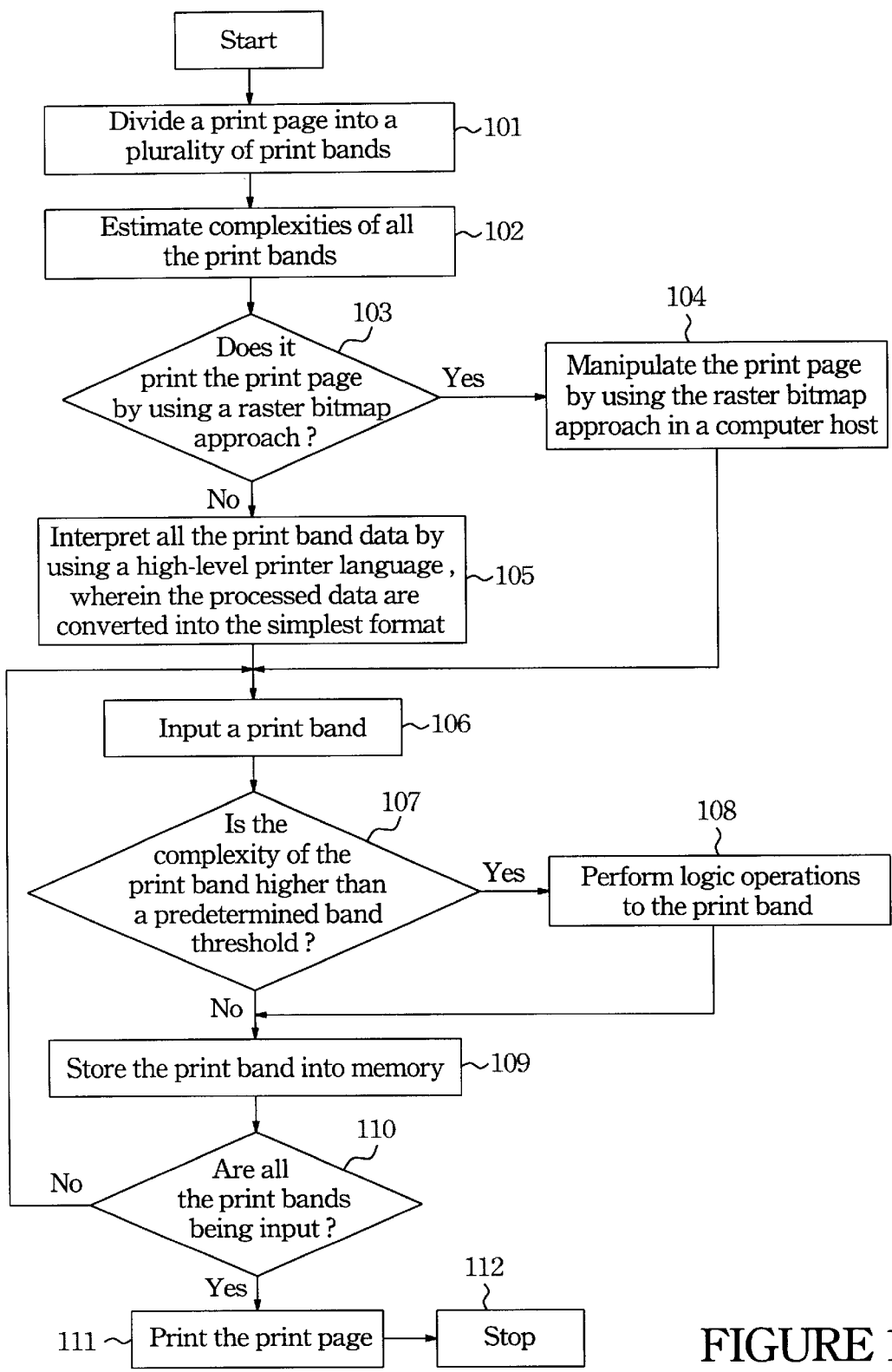
FIG. 1A is a flow chart representative of the operating processes in a laser printer according to the present invention.

Please refer to FIG. 1A, a flow chart describing the operating processes of a laser printer when employed the disclosed method is shown therein. When a print page is going to be printed, the print page is firstly divided into a plurality of print bands in block 101. Complexities of all the print bands are then estimated in block 102 in order to select the approach that has less time consumption between the raster bitmap and high-level printer language approaches in block 103. The computer host manipulates whole the print page by using the raster bitmap approach in block 104 when this approach has less time consumption. However, the computer host manipulates the print page by using the high-level printer language and performs image processing such as color matching and halftoning for those images stuck on the print page in block 105. Finally, the print page is converted into the simplest data format that employs one bit for each color channel of a pixel, for example, 3 bits are used to depict a pixel wherein every pixel is employed for depicting an R, G, or B color channel. A printer which employs any kind of color model, such as RGB, CMY, or CMYK model, can apply the disclosed method to simplify its command complexity, so as to decrease the time consumption of printing. Obviously, the data size is significantly decreased, and therefore the burden of performing the image processing can be degraded from the printers, which usually a computational-cost job. Additionally, color matching for the graphics and texts colors of the print page are processed in the computer host and the completely processed print bands are transferred to the printer band-by-band in block 106.

Required complexity of the printer commands of each print band is then estimated to decide whether the estimation is higher than a band threshold predetermined for print bands in block 107 after the printer receives those print bands. If the estimation is lower the band threshold, then the print band data are stored in memory in block 109. Otherwise, logic operations are firstly performed for those sticky objects of the print page such as graphics or texts in block 108 when the estimation is higher than the band threshold. The processed print band, which is converted into raster bitmap data, is then stored into memory in block 109. After all the print bands are transferred from the computer host to printer, all the transferred print bands are then printed through blocks 111 and 112. As noted, all the complicated print bands are firstly manipulated in blocks 108 and 109, therefore the printer only needs to retrieve and print the raster bitmap data stored in memory. The overrun disadvantage occurring in conventional approaches is thus avoidable. As noted, if the print bands in block 107 is manipulated by using the raster bitmap approach in block 104, the time consumption should be evidently less than the band threshold because the input data has been already converted into raster bitmap data. It requires quite less time consumption for directly storing the data in memory in block 109.

Because printers usually employ one bit to indicate whether a color channel is dotted by toner or ink, the color matching and halftoning are firstly performed at a format of 24 bits per pixel (8 bits respectively for R, G, and B channels) and then the processed print page is converted into a format of 3 bits per pixel (one bit respectively for R, G, and B channels) in block 104. Moreover, the sticky images are converted into a format of 3 bits (one bit respectively for R, G, B channels) or 4 bits (one bit respectively for C, M, Y, K channels) per pixel in block 108, the printers can easily restore the print page after interpreting the printer commands that indicate where the sticky images are located.

The complexity of a printer command is defined by its executing time, and generally, a complicated print command has more time consumption than a simple one. All operations of the graphics and texts, such as color matching, are completely processed in the computer host in block 105 because the computer host has more resources for use. In contrast, for a conventional high-level printer language, for example, a print control language (PCL), more built-in resources are needed in the printers such as more memory and faster CPUs to perform the color matching and halftoning for all sticky images, graphics, and texts included in print pages. However, those printers employing the disclosed method perform color matching and halftoning only for those sticky images, the required processing and printing time is significantly less than before because less data need to be manipulated.

The decision method in block 103 employs the following equations, wherein $T_0$ and $T_1$ respectively indicates the time consumption of applying the raster bitmap and high-level printer language approaches:

$$T_0 = \Sigma(C_i \times V_{pc}) + CM + HT + CP_{est} + TR_{bitmap} + Eng \qquad \text{(equation 1)}$$

$$T_1 = \Sigma(C_i \times V_{prn}) + CM' + HT' + TR_{prtcmd} + TGR + Eng \qquad \text{(equation 2)}$$

Wherein the parameters of the above equations are:

Parameter Definition $C_i$: complexity of the $i^{th}$ print band $V_{pc}$: time consumption of the computer host for performing a complexity unit CM: time consumption for performing color matching of whole the print page HT: time consumption for performing halftoning of whole the print page CM': time consumption for performing color matching of the sticky image HT': time consumption for performing halftoning of the sticky page $CP_{est}$: time consumption of compressing a print page stored by raster bitmap approach $TR_{bitmap}$: time consumption of transferring a print page stored in a raster bitmap format from the computer host to the printer $V_{prn}$: time consumption of the printer for performing a complexity unit $TR_{prtcmd}$: time consumption of transferring printer commands from the computer host to the printer TGR: additional processing time for preventing overrun Eng: required printing time of the printer The print data are completely processed and then compressed in computer host before transferring to printers when the raster bitmap approach is used, therefore $T_0$ derived from (equation 1) is obtained by summing the required complexity of performing all the print bands ($\Sigma(C_i \times V_{pc})$), and the time for performing color matching and halftoning of whole the print page (respectively indicated by CM and HT), compressing and transferring time of the print page (respectively indicated by $CP_{est}$ and $TR_{bitmap}$), and the required printing time of the printer (indicated by Eng).

In the high-level printer language approach, the time consumption includes the complexity of the required printer commands performed in the computer host ($\Sigma(C_i \times V_{prn})$), the time for transferring the printer commands to printer (indicated by $TR_{prtcmd}$), the time for performing color matching and halftoning of the sticky images (respectively indicated by CM' and HT'), additional processing time for preventing from overrun (indicated by TGR), and the required printing time of the printer (indicated by Eng). As noted, the above-mentioned color matching and halftoning are performed for the sticky images instead of whole the print page, therefore the data manipulated in the disclosed method are significantly less than the conventional raster bitmap approach.

The selected approach can be obtained by finding the smaller one between $T_0$ and $T_1$ by using (equation 1) and (equation 2) in block 103. In other words, it is better to employ the raster bitmap approach when $T_0$ is less than $T_1$ because the currently processed print page is quite complicated. The other print pages whose estimated $T_0$ is larger than $T_1$ should be manipulated by high-level printer language. Additionally, in block 107, the band threshold used in laser printers can be determined according to the specifications such as the print speed of the printer engines. However, it should prevent from determining an over higher band threshold because undesired overrun may occur when printing a complicated print page. On the other hand, an over lower band threshold should force the computer host to perform unnecessary pre-processing steps even overrun does not happen actually.

Figure 5:
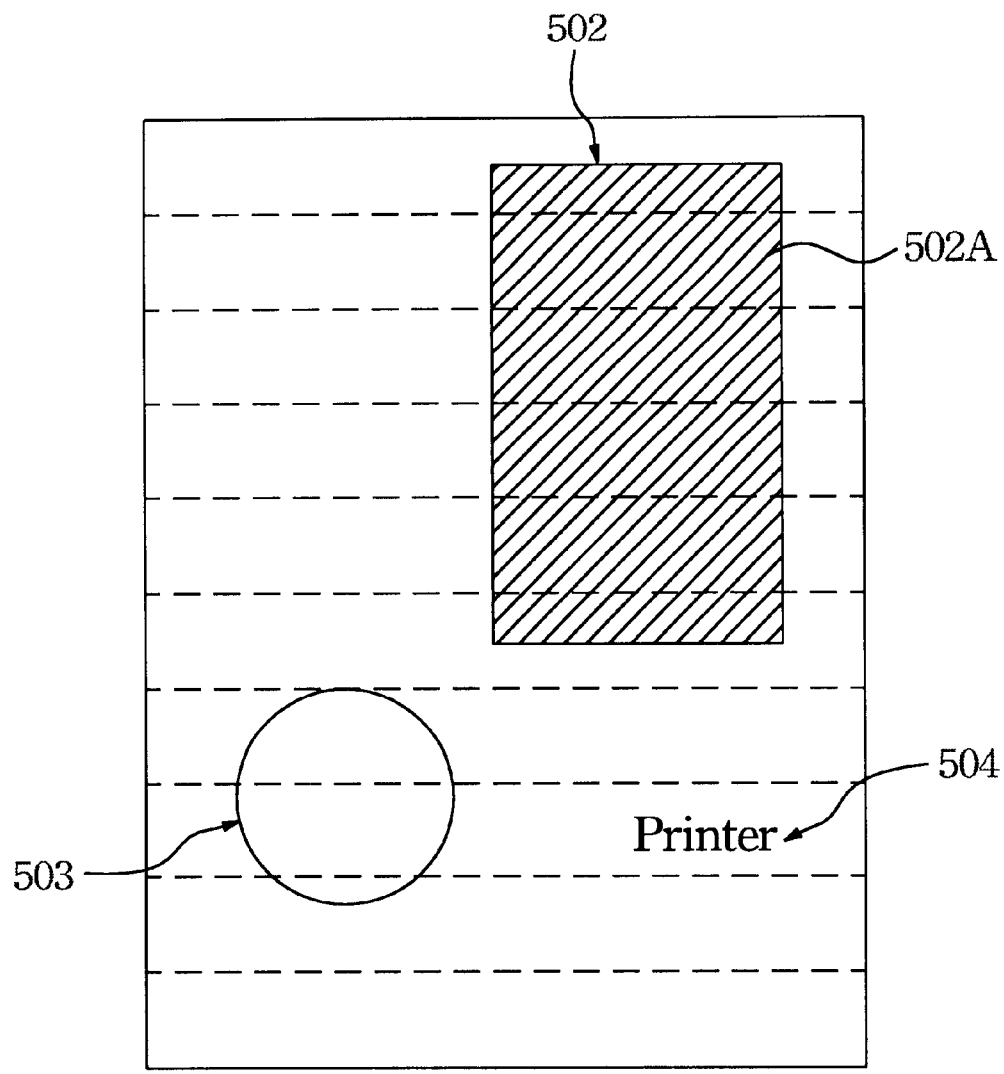
FIG. 5 shows a diagram illustrative of when a print page having a sticky image, a graphics, and a text, wherein the print page is divided into ten print bands.

An example in FIG. 5 is used for giving more descriptions about the operating flow of FIG. 1 when printing via a laser printer. The print page 501 in FIG. 5, which encompasses a sticky image 502 enclosed by a solid line, a circle graphic 503, and a text "Printer" 504, is divided into 10 print bands. Assume that the time consumption of applying the high-level printer language approach is the smaller one, the print bands of the print page 501 should be manipulated to determine which approach is employed in block 107. As noted, a more complicated images usually require more complicated printer commands for drawing, therefore the complexity of a print band may be higher than the band threshold when estimating its complexity as above. On the other hand, the sticky image 502 is completely processed in the computer host, for example, to convert the sticky image 502 into a format of 3 or 4 bits per pixel (one bit respectively for a color channel), and to divide it into a plurality of sticky sub-images associated with print bands. Those sticky sub-images will be stuck on associated print bands via logic operations in block 108, for example, the sticky sub-image 502A is stuck on the second print band. On the other hand, the graphic 503 and text 504 are depicted on the print page by using the high-level printer language approach after the required halftoning is completely performed. Therefore, although more processing time is required for the printer CPU to manipulate some of the print bands in FIG. 5, however, it still consumes less time than the conventional raster bitmap approach when printing the same print page. The overrun disadvantage is also eliminated in the present invention.

Figure 1B:
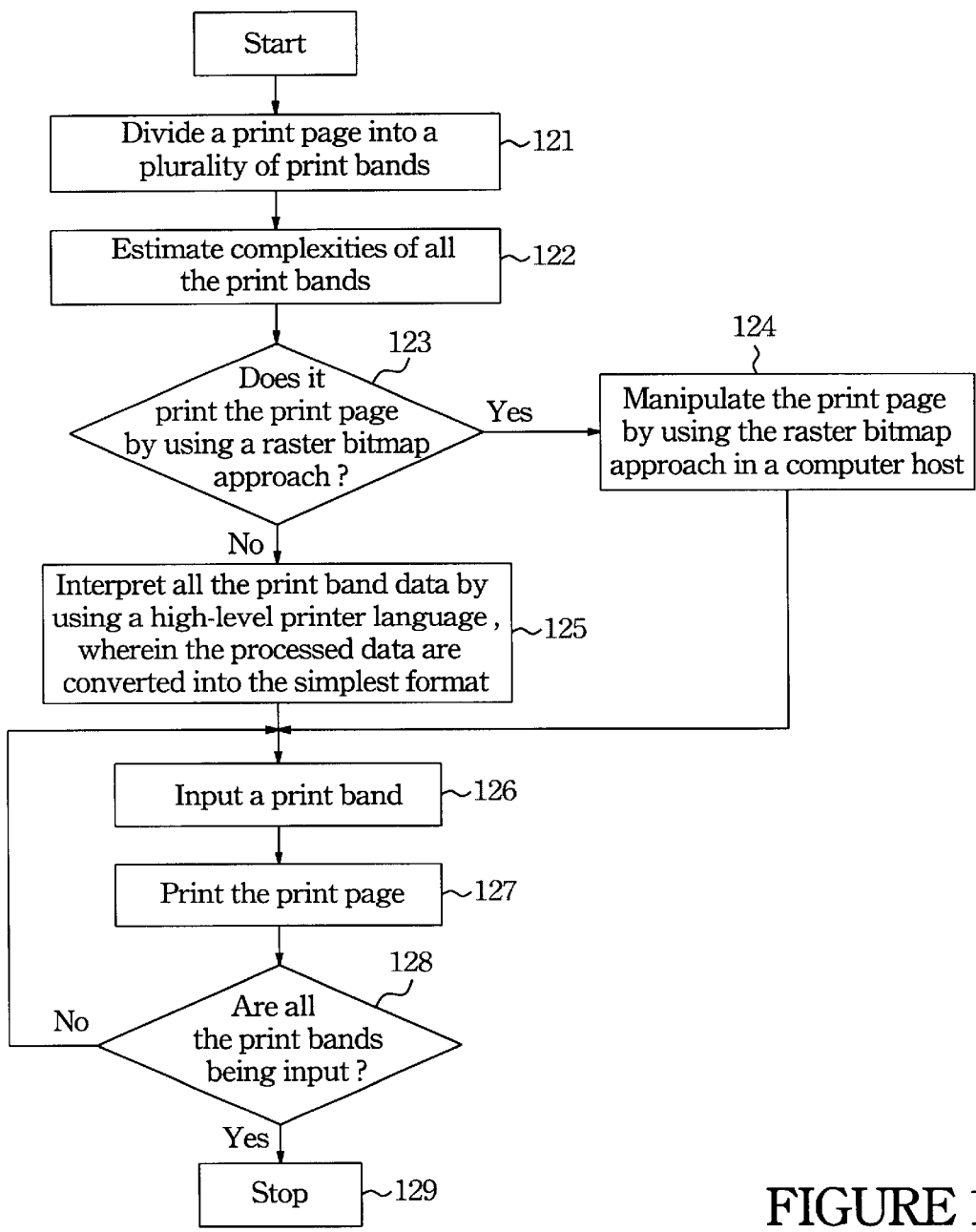
FIG. 1B is a flow chart representative of the operating processes in an ink-jet printer according to the present invention.

Please refer to FIG. 1B, a flow is used to give more detailed descriptions when performing the disclosed method in ink-jet printers. The current print page is firstly divided into a plurality of print bands in block 121. The complexities of all the print bands are then estimated in block 122 to decide which approach has less time consumption between the raster bitmap and high-level printer language approaches in block 123. The computer host manipulates the print page by using the raster bitmap approach in block 123 when its time consumption is less than the other one. In contrast, the print page will be described by using the high-level printer language in block 125, wherein the images stuck in the print page is furthermore converted into the simplest format. All the processed print bands are transferred to the ink-jet printer band-by-band in block 126. The ink-jet printer then prints the transferred print bands until all the print bands are printed in blocks 128 and 129.

In fact, by applying the disclosed method also can decrease the time consumption of the ink-jet printers because the conventional ink-jet printers usually employ the raster bitmap approach to perform the color matching and halftoning for whole the print page. However, only those print bands that their complexities are higher than the band threshold employ the raster bitmap approach in the disclosed method, therefore the time consumption is significantly less than before. Additionally, overrun does not occur in the ink-jet printers because their printer engines can be halted to wait for the print data when printing, therefore the operation flow is simpler than that of the laser printers.

Figure 2:
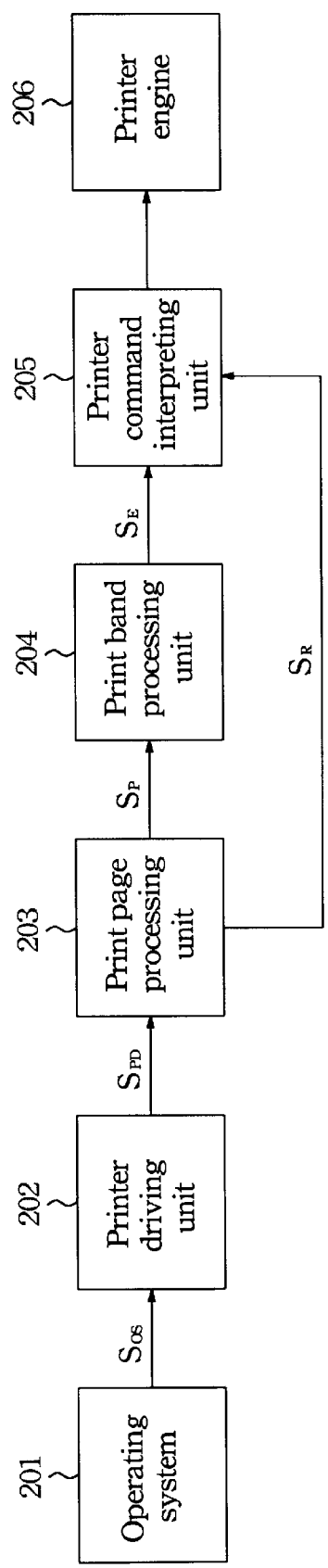
FIG. 2 illustrates a schematic diagram of the system by applying the double printing modes according to the present invention.

Please refer to FIG. 2, a schematic diagram of the preferred embodiment is shown therein. When the operating system 201 of the computer host transfers a print page ($S_{OS}$) for printing, a printer driving unit 202 selects an approach and then transfers $S_{OS}$ and its decision (both are including in $S_{PD}$) to a print page processing unit 203 for further processing. The print page processing unit 203 still located in the computer host then generates printer commands $S_R$ and then directs them to a printer command interpreting unit 205 located in the printer when the raster bitmap scheme is selected. Finally, a printer engine 206 prints the print page after the printer command interpreting unit 205 interprets $S_R$. Likewise, the print page processing unit 203 generates printer commands $S_P$ based on a high-level printer language, and sends $S_P$ to a print band processing unit 204 for further processing when the high-level printer language approach is used. The print band processing unit 204 estimates the complexities of all the print bands, and then decides whether a print band needs to perform logic operations firstly. Finally, the processed printer commands $S_E$ are then interpreted by the printer command interpreting unit 205 before printing through the printer engine 206.

Figure 3:
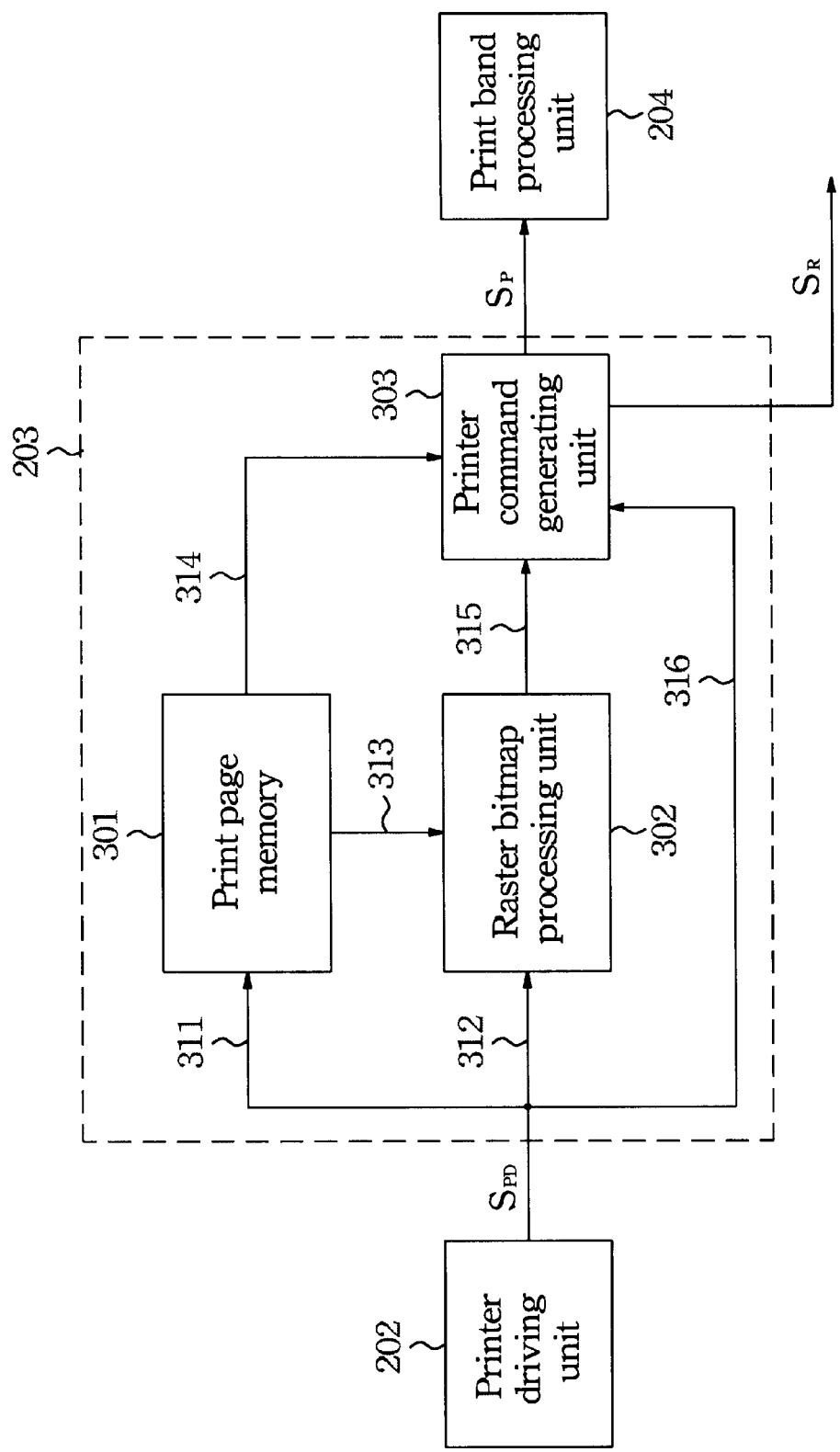
FIG. 3 illustrates a detailed diagram of the print page processing unit in FIG. 2.

Please refer to FIG. 3, a detailed diagram of the print page processing unit 203 is shown therein. When the print page processing unit 203 receives the decision and the print data from the printer driving unit 202 (printer commands are routed to a print page memory 301 via a data line 311), the decision will drive a raster bitmap processing unit 302 (the decision is routed in from a data line 312) to depict the print page stored in the print page memory 301 (from a data line 313) by using a format of 24 bits per pixel (respectively 8 bits for a color channel). Color matching and halftoning are then performed for the processed raster bitmap data to convert them into a raster bitmap format of 3 bits per pixel (respectively one bit for a color channel). As noted, the converted raster bitmap data are then encapsulated into a plurality of print bands (via a data line 315), each the print band has been described as the simplest raster bitmap data. Those printer commands are interpreted by the printer command interpreting unit 205 (through $S_R$) before printing. On the other hand, the decision will be fed into the printer command generating unit 303 (though a data line 316), and in accompanied with the print data in the print page memory 301 (from a data line 314) to generate required printer commands when the high-level printer language is selected. The generated printer commands are then transferred to print band processing unit 204 for printing (through $S_P$). As noted, the print data stored in the print page memory 301 follows a metabolic data format. So-called metabolic data files are temporary files offered and employed between the operating system and the printer, the metabolic data are divided into a plurality of print bands to facilitate both of the raster bitmap and high-level printer language approaches.

Figure 4:
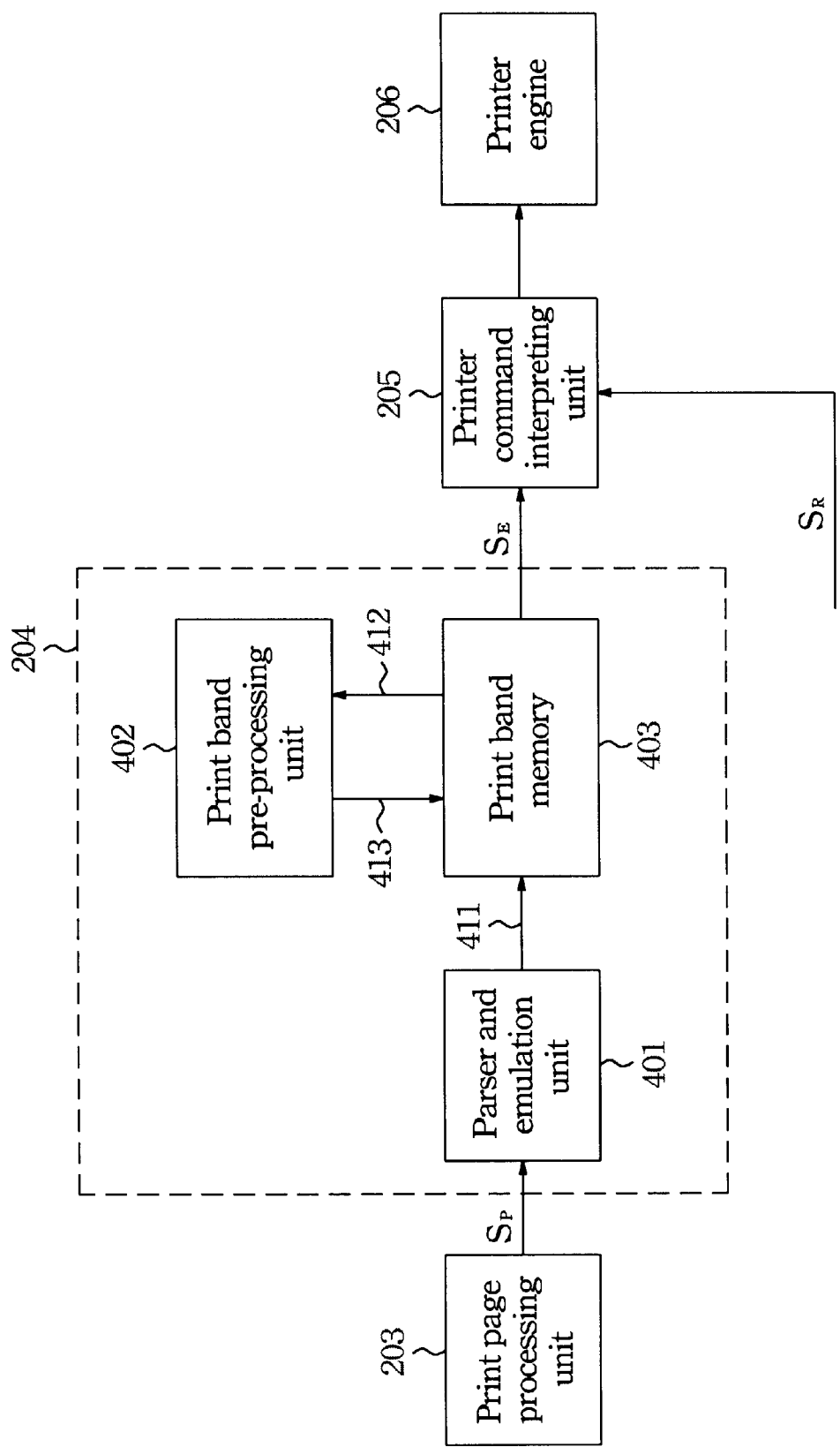
FIG. 4 illustrates a detailed diagram of the print band processing unit in FIG. 2.

Please refer to FIG. 4, a detailed schematic diagram of the print band processing unit 204 is illustrated therein. The printer commands transferred from the print page processing unit 203 are firstly fed into a parser and emulation unit 401 to estimate the complexity of each print band. Data of the print band are then directed to a print band memory 403 through a data line 411 when the estimated complexity is lower than the band threshold. A print band pre-processing unit 402 will be driven to retrieve the print band data from the print band memory 403 by following the indication of data line 412, and then the print band pre-processing unit 402 performs the logic operations to stick the sticky images on the print page. The processed data are then compressed and stored back to the print band memory 403 (through the indication of a data line 413) after completing the above logic operations. The stored data in the print band memory 403 are fetched and interpreted by the printer command interpreting unit 205 (through $S_E$). Please note that the schematic diagram in FIG. 4 is only employed in laser printers, and the print band pre-processing unit 402 pre-processes the print bands whose estimated complexities are higher than the band threshold only when driven by the parser and emulation unit 401. The overrun disadvantage can thus be completely eliminated in the present invention.

Next, the printer command interpreting unit 205 interprets the printer commands (can be fed from $S_E$ or $S_R$) and converts them into a raster bitmap format before printing via the printer engine 206. As noted, the interpreted print bands in the printer command interpreting unit 205 stores the interpreted data band-by-band for printing purpose. Furthermore, when the structure of FIGS. 2 to 4 are employed in an ink-jet printer, the print band pre-processing 402 can be removed because the print engine 206 of the ink-jet printer can wait the consecutive print data without the overrun disadvantage, which further simplify the required printer structure.

In conclusion, the disclosed method and system by using double printing modes can simplify the printer commands by selecting the raster bitmap or the high-level printer language approach after estimating the complexities of the print page and print bands. Additionally, both the laser and ink-jet printers can employs the approach of the present invention to facilitate their print speed.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for printing a printing job by using a plurality of printing modes, wherein said printing method comprises the steps of:

inputting a print page;

generating a first processing time indicative of time consumption when employing a raster bitmap approach;

generating a second processing time indicative of time consumption when employing a printer language approach;

selecting a printing mode by using said first processing time and said second processing time; and printing said print page by using said selected printing mode.

2. The printing method according to claim 1, wherein said first processing time is generated by a first processing time generating method comprising the steps of:

generating a first estimation time indicative of time consumption for manipulating all print bands of said print page in a computer host;

generating a second estimation time indicative of time consumption for performing image processing for said print page in said computer host;

generating a third estimation time indicative of time consumption for compressing said print page;

generating a fourth estimation time indicative of time consumption for transferring said print page to a printer which is connected with said computer host;

generating a fifth estimation time indicative of time consumption for printing said print page by said printer; and generating said first processing time by summing said first estimation time, said second estimation time, said third estimation time, said fourth estimation time, and said fifth estimation time.

3. The printing method according to claim 1, wherein said second processing time is generated by a second processing time generating method comprising the steps of:

generating a sixth estimation time indicative of time consumption for manipulating all print bands of said print page in a computer host;

generating a seventh estimation time indicative of time consumption for manipulating sticky images of said print page;

generating an eighth estimation time indicative of time consumption for transferring said print page to a printer which is said computer host connected with;

generating a ninth estimation time indicative of time consumption for printing said print page by said printer; and generating said second processing time by summing said sixth estimation time, said seventh estimation time, said eighth estimation time, and said ninth estimation time.

4. The printing method according to claim 1, wherein said printing mode is selected by a selecting method comprising the steps of:

employing said raster bitmap approach to manipulate said print page when said first processing time is less than said second processing time; and employing said printer language approach to manipulate all print bands of said print page band-by-band when said second processing time is less than said first processing time.

5. The printing method according to claim 4, wherein said print bands are band-by-band manipulated by a processing method comprising the steps of:
   generating a complexity of printer commands for each one of said print bands;
   performing logic operations for sticky images associated with said print band when said complexity of said print band is higher than a band threshold; and
   manipulating said print band by using said printer language approach.

6. The printing method according to claim 5, further comprising a compression step being performed after said logic operations to compress said printer commands, wherein said compression step comprises a step of performing halftoning for graphics and texts associated said print band at a format of one bit per pixel.

7. A method for printing a printing job by using double printing modes, wherein said printing method comprises the steps of:
   inputting a print page;
   generating a first processing time indicative of time consumption time when employing a raster bitmap approach;
   generating a second processing time indicative of time consumption when employing a printer language approach;
   employing said raster bitmap approach to manipulate and print said print page when said first processing time is less than said second processing time; and
   employing said printer language approach to manipulate and print all print bands of said print page band-by-band when said second processing time is less than said first processing time.

8. The printing method according to claim 7, wherein said first processing time is generated by a first processing time generating method comprising the steps of:
   generating a first estimation time indicative of time consumption for manipulating all print bands of said print page in a computer host;
   generating a second estimation time indicative of time consumption for performing image processing for said print page in said computer host;
   generating a third estimation time indicative of time consumption for compressing said print page;
   generating a fourth estimation time indicative of time consumption for transferring said print page to a printer which is connected with said computer host;
   generating a fifth estimation time indicative of time consumption for printing said print page by said printer; and
   generating said first processing time by summing said first estimation time, said second estimation time, said third estimation time, said fourth estimation time, and said fifth estimation time.

9. The printing method according to claim 7, wherein said second processing time is generated by a second processing time generating method comprising the steps of:
   generating a sixth estimation time indicative of time consumption for manipulating all print bands of said print page in a computer host;
   generating a seventh estimation time indicative of time consumption for manipulating sticky images of said print page;
   generating an eighth estimation time indicative of time consumption for transferring said print page to a printer which is connected with said computer host;
   generating a ninth estimation time indicative of time consumption for printing said print page by said printer; and
   generating said second processing time by summing said sixth estimation time, said seventh estimation time, said eighth estimation time, and said ninth estimation time.

10. The printing method according to claim 9, wherein said print bands are processed by a processing method comprising the steps of:
    generating a complexity of printer commands for each one of said print bands;
    performing logic operations for sticky images associated with said print band when said complexity of said print band is higher than a band threshold; and
    manipulating said print band by using said printer language approach.

11. The printing method according to claim 10, further comprising a compression step being performed after said logic operations to compress said printer commands, wherein said compression step comprises a processing step of performing halftoning for graphics and texts associated with said print band at a format of one bit per pixel.

12. The printing method according to claim 7, wherein said printer language approach employs a printer control language (PCL) or PostScript language.

13. A system of printing a printing job by using a plurality of printing modes, wherein said printing system comprises:
    printer driving means responsive to a print page for generating a print page decision to decide a printing mode;
    printer processing means located in a computer host responsive to said print page decision for generating printer commands required for said print page, said printer commands being directed to a printer connected with said computer host for generating a print band processing signal indicative of said print page being dividing into a plurality of print bands for printing; and
    print band processing means responsive to said print band processing signal for estimating complexities of said print bands, and for directing said processed print bands to said printer after said print band being manipulated.

14. The printing system according to claim 13, wherein said print page processing means comprises:
    raster bitmap processing means responsive to said print page decision for manipulating said print page by using a raster bitmap approach; and
    printer command generating means responsive to said print page being manipulated by said raster bitmap processing means for generating said printer commands used by said printer, and responsive to said print page decision for generating said print band processing signal.

15. The printing system according to claim 13, wherein said print band processing means comprises:
    parser and emulation means responsive to said print band processing signal for generating a print page decision to decide a print mode employed for said print band; and
    print band pre-processing means responsive to said print page decision result for performing logic operations at sticky images including in said print band to stick said sticky images on said print band.

16. The printing system according to claim 15, wherein said print band processing means comprises print band storing means for storing said print band processed by said print band pre-processing means and said parser and emulation means.

17. The printing system according to claim 16, wherein said print band pre-processing means compresses said printer commands and directs said compressed printer commands to be stored in said print band storing means after completing said logic operations.

18. The printing system according to claim 13, wherein said printer comprises:

printer command interpreting means for interpreting said printer commands to generate raster bitmap data described in a format of one bit per pixel; and printer engine responsive to said raster bitmap data for printing said print page.

19. The printing system according to claim 13, wherein said print page decision is generated by the steps of:

generating a first processing time indicative of time consumption when employing a raster bitmap approach;

generating a second processing time indicative of time consumption when employing a printer language approach;

generating said print page decision indicative of employing said raster bitmap approach to manipulate said print page when said first processing time is less than said second processing time; and generating said print page decision indicative of employing said printer language approach to manipulate all print bands of said print page band-by-band when said second processing time is less than said first processing time.

20. The printing system according to claim 13, wherein said printer language approach employs a printer control language (PCL) or PostScript language.

\* \* \* \* \*